US008652687B2

(12) United States Patent
Zhamu et al.

(10) Patent No.: US 8,652,687 B2
(45) Date of Patent: Feb. 18, 2014

(54) CONDUCTIVE GRAPHENE POLYMER BINDER FOR ELECTROCHEMICAL CELL ELECTRODES

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 832 days.

(21) Appl. No.: 12/655,172

(22) Filed: Dec. 24, 2009

(65) Prior Publication Data
US 2011/0159372 A1    Jun. 30, 2011

(51) Int. Cl.
*H01M 4/62* (2006.01)
*H01M 4/04* (2006.01)
*H01G 9/058* (2011.01)

(52) U.S. Cl.
CPC ............... *H01M 4/62* (2013.01); *H01M 4/621* (2013.01); *H01M 4/625* (2013.01)
USPC ............................. 429/232; 427/58; 361/502

(58) Field of Classification Search
USPC ............................. 429/232; 427/58; 361/502
See application file for complete search history.

(56) References Cited

U.S. PATENT DOCUMENTS

| 2,798,878 | A | 7/1957 | Hummers |
| 6,872,330 | B2 | 3/2005 | Mack et al. |
| 7,071,258 | B1 | 7/2006 | Jang et al. |
| 7,105,108 | B2 | 9/2006 | Kaschak et al. |
| 7,157,517 | B2 | 1/2007 | Gulari et al. |
| 2007/0009799 | A1* | 1/2007 | Zheng ........................ 429/231.8 |
| 2008/0279756 | A1* | 11/2008 | Zhamu et al. ............... 423/448 |
| 2009/0092747 | A1 | 4/2009 | Zhamu et al. |
| 2009/0325071 | A1* | 12/2009 | Verbrugge et al. ............ 429/219 |
| 2010/0008021 | A1* | 1/2010 | Hu et al. ........................ 361/502 |

FOREIGN PATENT DOCUMENTS

| JP | 08167413 | * | 6/1996 | ............. H01M 4/58 |
| WO | 2009/061685 | | 5/2009 | |
| WO | 2009/085015 | | 7/2009 | |

OTHER PUBLICATIONS

Wang et al., "Self-Assembled TiO2-Graphene Hybrid Nanostructures for Enhanced Li-Ion Insertion", Mar. 26, 2009, ACS Nano, vol. 3 No. 4, 907-914.*
Park and Ruoff, "Chemical Methods for the Production of Graphenes", Mar. 29, 2009, Nature Nanotechnology, vol. 4 April, 217-224.*
Abouimrane et al. "Non-Annealed Graphene Paper as a Binder-Free Anode for Lithium-Ion Batteries." J. Phys. Chem. 114, 12800-12804 (2010).*
PCT, International Search Report and Written Opinion, International Application No. PCT/US2010/061949 (Apr. 18, 2011).

(Continued)

*Primary Examiner* — Milton I Cano
*Assistant Examiner* — Michael Dignan
(74) *Attorney, Agent, or Firm* — Mark Levy; Thompson Hines, LLP

(57) ABSTRACT

The present invention provides an electrically conductive electrode comprising particles of an electroactive material and a conductive graphene polymer binder that bonds multiple particles of the electroactive material together, wherein the binder is in an amount of from 0.01% to 90% by weight based on the total electrode weight. Also provided are (a) a precursor solution or suspension to the graphene polymer binder for the electrode; (b) a paste containing electroactive particles and a graphene polymer dispersed in a liquid; (c) a method of producing the electrode from the precursor paste; and (d) an electrochemical cell (a battery or supercapacitor) containing such an electrode.

23 Claims, 6 Drawing Sheets

(56) References Cited

OTHER PUBLICATIONS

Jang, B.Z. et al., "Processing of nanographene platelets (NGPs) and NGP nanocomposites: a review," *J. Mater. Sci.* 43, pp. 5092-5101 (2008).

Li, D. et al., "Processable aqueous dispersions of graphene nanosheets," *Nature Nanotechnology*, vol. 3, pp. 101-105, (Feb. 2008).

Stankovich, S. et al., "Synthesis and exfoliation of isocyanate-treated graphene oxide nanoplatelets," *Carbon*, 44, pp. 3342-3347 (2006).

Wang, D. et al., "Self-Assembled $TiO_2$-GrapheneHybrid Nanostructures for Enhanced Li-Ion Insertion," *ACSNano*, vol. 3, No. 4, pp. 907-914 (2009).

U.S. Appl. No. 11/442,903, filed Jun. 20, 2006, Jang.

U.S. Appl. No. 11/800,728, filed May 8, 2007, Zhamu, et al.

Bor Z. Jang and A Zhamu, "Processing of Nano Graphene Platelets (NGPs) and NGP Nanocomposites: A Review," J. Materials Sci. 43 (2008) 5092-5101.

L. M. Viculis, et al "A chemical route to carbon nanoscrolls," Science, 299, 1361 (2003).

X. Yang, et al. "Two-dimensional Graphene Nano-ribbons," J. Am. Chem. Soc. 130 (2008) 4216-1765.

S. Stankovich, et al. "Synthesis and exfoliation of isocyanate-treated graphene oxide nanoplatelets," Carbon 44, 3342-3347 (2006).

D. Li, et al "Processable aqueous dispersions of graphene nanosheets," Nature Nanotechnology 3, 101-105 (2008).

\* cited by examiner

CONDUCTIVE GRAPHENE POLYMER BINDER FOR ELECTROCHEMICAL CELL ELECTRODES

This invention is based on research results of a project supported by the US NSF SBIR-STTR Program.

FIELD OF THE INVENTION

The present invention relates generally to the field of binders and conductive additives for electrochemical cell electrodes, and more particularly to the conductive binder and additive for the electrode of a lithium metal battery, lithium-ion battery, or supercapacitor. The invented binder, also serving as a conductive additive, is composed of conductive graphene sheets or graphene polymers. The invention also provides a conductive binder precursor solution, suspension, or paste containing a graphene polymer dissolved or dispersed in a liquid medium.

BACKGROUND OF THE INVENTION

Polyvinylidene fluoride (PVDF) and styrene-butadiene rubber (SBR) are the most commonly used binder materials for the anode and cathode of a lithium-ion battery or for the cathode of a lithium metal battery. However, both materials are not electrically or thermally conductive. Further, they are not an electro-active material; i.e. they are not capable of storing lithium when used as a binder in either the anode or the cathode. These features pose some undesirable consequences:

(1) The electrochemical reaction in a Li-ion battery is exothermic and thus the battery generates heat in both the charge and discharge cycle. Further, significant exothermic heat generation occurs in the Li-ion battery under abusive conditions, such as a short circuit, overcharging, over-discharging, and operation at high temperatures. The exothermic heat generation is attributed to a combination of effects, including the reaction of the PVDF in the electrodes with "lithiated" carbon, reaction of electrolyte with oxygen liberated due to decomposition of the cathode material, and breakdown of the electrode passivation layers. Low heat dissipation rates in the Li-ion battery can compromise the performance of the battery and may result in the release of combustible gasses at high temperatures, known as "thermal runaway". Hence, it is critically important to have both the binder and the electrically conductive additive being thermally conductive as well.

(2) Due to extremely poor electrical conductivity of all cathode active materials in a lithium-ion or lithium metal cell, a conductive additive (e.g. carbon black, fine graphite particles, expanded graphite particles, or their combinations), typically in the amount of 5%-20% (sometimes up to 50%), must be added into the electrode. Both the binder and the conductive additive are not an electrochemically active (electroactive) material. The use of a non-electroactive material means that the relative proportion of an electroactive material is reduced. For instance, the incorporation of 10% by weight of PVDF and 10% of carbon black in a cathode would mean that the maximum amount of the cathode active material (e.g., lithium cobalt oxide) is only 80%, effectively reducing the total lithium ion storage capacity. Since the specific capacities of the more commonly used cathode active materials are already very low (140-170 mAh/g), this problem is further aggravated if a significant amount of non-active materials is used to dilute the concentration of the active material.

Clearly, an urgent need exists for a binder material that is conductive to both heat and electrons. Such a thermally conductive binder would be capable of dissipating the heat generated from the electrochemical operation of the Li-ion battery, thereby increasing the reliability of the battery and decreasing the likelihood that the battery will suffer from thermal runaway and rupture. If the binder is also electrically conductive, there would be reduced need or no need to have a separate conductive additive. Preferably, such a need for a separate additive is eliminated all together.

Thus, the present invention is directed to the provision of such a binder material for an electro-chemical cell that has effective heat dissipation capability and reduced electrical resistance during electrical charge and discharge of the battery.

The primary ingredient of the presently invented conductive binder is a graphene polymer. A graphene polymer is basically an aromatic, fused benzene ring-type of structure, which is substantially similar or identical to a graphene plane of a graphite or graphite oxide material. In a graphene plane, carbon atoms occupy a 2-D hexagonal lattice in which carbon atoms are bonded together through strong in-plane covalent bonds. The graphene polymer may contain a small amount (typically<25% by weight) of non-carbon elements, such as hydrogen, fluorine, and oxygen, which are attached to an edge or surface of the graphene plane. The 2-D hexagonal carbon structure may be characterized in several essentially equivalent ways: (a) by the total number of carbon atoms in the planar structure, (b) by the number of carbon hexagons along each of the two directions (e.g., a and b or x- and y-direction) of a two-dimensional polymer structure, (c) by the sizes in the two directions (length and width), or (d) by the molecular weight of a 2-D polymer structure.

It may be noted that multiple graphene polymer units (i.e., several fused benzene ring units or carbon hexagon structure units) may stack up to form a multi-layer nano graphene platelet (NGP) or graphene nano-sheet when the graphene polymers precipitate out from a solution or suspension into a solid powder form. Hence, an NGP is a nanoscale platelet or sheet composed of one or more layers of a graphene plane, with a platelet thickness from less than 0.34 nm (single layer) to 100 nm (multi-layer, more typically <10 nm and most typically <2 nm). In the c-axis or thickness direction, these graphene planes may be weakly bonded together through van der Waals forces. The presently invented conductive binder typically and preferably contains mostly single-layer graphene structures while they are dispersed or dissolved in a liquid medium to form a graphene polymer suspension or solution. Such a graphene polymer suspension or solution is herein referred to as a binder precursor. The graphene binder polymer can contain a small amount of few-layer graphene platelets when the liquid medium is removed.

Graphene sheets or graphene polymer units may be oxidized to various extents during their preparation, resulting in graphite oxide (GO) or graphene oxide. Hence, in the present context, graphene polymers preferably or primarily refer to those containing no or low oxygen content; but, they can include GO of various oxygen contents. Further, graphene polymers may be fluorinated to a controlled extent to obtain graphite fluoride polymers, which are also considered one type of the presently invented graphene polymer.

It is of significance to herein point out that nano graphene materials, including single-layer and multi-layer NGPs, were not known in the art to be a binder capable of bonding solid particles together. As a matter of fact, when nano graphene powder and solid particles of an electro-active material are simply mixed together without using a resin binder (e.g. PVDF), the resulting mixture would be a sand-like mass containing separate particles and having no coherent integrity. Quite surprisingly, when the graphene sheets are dissolved or dispersed in a properly selected liquid, the resulting graphene polymer solution or suspension becomes a precursor to a conductive binder. By mixing particles of an electro-active material in this precursor solution or suspension to form a slurry or paste and then removing the liquid from the resulting slurry or paste, the resulting solid mass is characterized by having graphene polymers well bonded to particles of the electro-active materials (e.g., lithium cobalt oxide particles as a cathode active material and carbon-coated graphite particles as an anode active material). The resulting solid mixture is of good structural integrity even though no other resin binder (e.g., PVDF or SBR) is used. This discovery was most surprising and was not taught in the prior art.

Further surprisingly, a precursor binder solution or suspension does not have to be prepared by mixing already-isolated nano graphene sheets, either single-layer or multi-layer, in a liquid medium. The precursor binder solution or suspension can be obtained by directly mixing exfoliated graphite (graphite worms), expanded graphite flakes, or isolated minute graphite crystallites in a properly selected liquid medium at a temperature for a desired period of time. A graphite worm is composed of weakly interconnected graphite flakes (thickness>100 nm) and/or nano graphene platelets (thickness<100 nm). The interconnections in graphite worms can then be broken up, via ultrasonication or mechanical shearing, to obtain separated or isolated graphite flakes (also referred to as expanded graphite flakes with a thickness>100 nm) or NGPs (thickness<100 nm). The graphite worms, when re-dispersed in an acid medium, can be gradually dissolved to form a graphene solution.

The processes for producing graphene materials, including single-layer and multi-layer NGPs, have been recently reviewed by the applicants [Bor Z. Jang and A Zhamu, "Processing of Nano Graphene Platelets (NGPs) and NGP Nanocomposites: A Review," J. Materials Sci. 43 (2008) 5092-5101]. Basically, there are four different approaches that have been followed to produce NGPs. Their advantages and shortcomings are briefly summarized as follows:

Approach 1: Formation and Reduction of Graphite Oxide (GO) Platelets

The first approach entails treating a laminar graphite material (e.g., in most cases, natural graphite powder) with an intercalant and an oxidant (e.g., concentrated sulfuric acid and nitric acid, respectively) to obtain a graphite intercalation compound (GIC) or, actually, graphite oxide (GO). The obtained GIC or GO is then subjected to exfoliation using either a thermal shock exposure or a solution-based graphene layer separation approach.

Technically, the acid-treated graphite is actually oxidized graphite or graphite oxide (GO), rather than pristine graphite. In the thermal shock exposure approach, the GIC or GO is exposed to a high temperature (typically 800-1,050° C.) for a short period of time (typically 15 to 60 seconds) to exfoliate the treated graphite. Typically, the exfoliated graphite oxide is then subjected to a further sheet or flake separation treatment using air milling, mechanical shearing, or ultrasonication in a liquid (e.g., water).

In the solution-based graphene separation approach, the GO powder is dispersed in water or aqueous alcohol solution, which is subjected to ultrasonication. Alternatively, the GO powder dispersed in water is subjected to some kind of ion exchange or purification procedure in such a manner that the repulsive forces between ions residing in the inter-planar spaces overcome the inter-graphene van der Waals forces, resulting in graphene layer separations.

In both the heat- or solution-induced exfoliation approaches, the resulting products are GO platelets that must undergo a further chemical reduction treatment to reduce (but normally not eliminate) the oxygen content. Typically even after reduction, the electrical conductivity of GO platelets remains much lower than that of pristine graphene. Furthermore, the reduction procedure often involves the utilization of undesirable chemicals, such as hydrazine. In some cases of solution-based exfoliation, the separated and dried GO platelets were re-dispersed in water and then cast into thin GO films. These films were exposed to a high temperature, high vacuum environment for de-oxygenation, but the resulting GO platelets were no longer dispersible in water or other solvents.

Approach 2: Direct Formation of Pristine Nano Graphene Platelets

Jang, et al. succeeded in isolating single-layer and multi-layer graphene structures from partially carbonized or graphitized polymeric carbons, which were obtained from a polymer or pitch precursor. Carbonization involves linking aromatic molecules or planar cyclic chains to form graphene domains or islands in an essentially amorphous carbon matrix. For instance, polymeric carbon fibers were obtained by carbonizing polyacrylonitrile (PAN) fibers to a desired extent that the fiber was composed of individual graphene sheets isolated or separated from each other by an amorphous carbon matrix. The resulting fibers were then subjected to a solvent extraction, or intercalation/exfoliation treatment. Graphene platelets were then extracted from these fibers using a ball milling procedure. Please refer to B. Z. Jang and W. C. Huang, "Nano-scaled graphene plates," U.S. Pat. No. 7,071,258 (Jul. 4, 2006) and B. Z. Jang, "Process for nano-scaled graphene plates," U.S. patent application Ser. No. 11/442,903 (Jun. 20, 2006).

Mack, Viculis, and co-workers developed a low-temperature process that involved intercalating graphite with potassium melt and contacting the resulting K-intercalated graphite with alcohol, producing violently exfoliated graphite containing many ultra-thin NGPs. [J. J. Mack, et al., "Chemical manufacture of nanostructured materials," U.S. Pat. No. 6,872,330 (Mar. 29, 2005); L. M. Viculis, et al "A chemical route to carbon nanoscrolls," Science, 299, 1361 (2003)]. The process must be carefully conducted in a vacuum or an extremely dry glove box environment since pure alkali metals, such as potassium and sodium, are extremely sensitive to moisture and pose an explosion danger. It is questionable if this process is easily amenable to the mass production of nano-scaled platelets. One major advantage of this process is the notion that it produces non-oxidized graphene sheets since no acid/oxidizer intercalation or a high temperature is involved.

The applicants disclosed a direct ultrasonication method capable of exfoliating and separating NGPs from various graphitic materials without subjecting the graphitic material to chemical intercalation or oxidation [A. Zhamu, et al, "Method of Producing Exfoliated Graphite, Flexible Graphite, and Nano-Scaled Graphene Plates," U.S. patent application Ser. No. 11/800,728 (May 8, 2007)]. The resulting NGPs are pristine graphene and are highly conductive, both thermally and electrically.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. Approach 4: The Bottom-Up Approach (Synthesis of Graphene from Small Molecules)

X. Yang, et al. ["Two-dimensional Graphene Nano-ribbons," J. Am. Chem. Soc. 130 (2008) 4216-1765] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Nano graphene materials prepared by the aforementioned processes have recently been found to exhibit exceptionally high thermal conductivity, high electrical conductivity, and high strength. As a matter of fact, single-layer graphene exhibits the highest thermal conductivity and highest intrinsic strength of all existing materials. However, graphene has not been known to be capable of serving as a binder capable of bonding solid particles together. It is most surprising for us to observe that graphene behaves like an adhesive that can hold electroactive particles together to form an electrode of good structural integrity, obviating the need to use a non-conductive, non-electroactive resin binder and a conductive additive.

Thus, it is an object of the present invention to provide a thermally and electrically conductive binder based on a graphene polymer, including (but not limited to) a relatively oxygen-free graphene polymer, an oxidized graphene polymer (GO polymer), and a graphene fluoride polymer. The binder may be used in an electrode of an electrochemical cell, such as a lithium battery or a supercapacitor.

Another object of the present invention is to provide an electrochemical cell electrode containing a graphene polymer as a binder without having to use a non-conductive binder resin and/or additional conductive additive.

A further object is to provide an electrochemical cell containing such an electrode.

It is another object of the present invention to provide a precursor to a graphene polymer binder. The precursor contains a graphene polymer, graphene oxide polymer, or graphene fluoride dissolved or dispersed in a liquid medium (e.g. an organic solvent or water) to form a graphene polymer-solvent solution or graphene polymer-liquid suspension. Also provided is a paste containing electroactive particles dispersed in such a precursor solution or suspension.

SUMMARY OF THE INVENTION

The present invention provides an electrically conductive electrode for an electrochemical cell, such as a lithium ion battery, lithium metal battery, lithium-air battery, other alkali or alkaline battery, or supercapacitor. As one preferred embodiment, the electrode is comprised of multiple particles of an electro-active material and a conductive graphene polymer binder that bonds multiple particles of the electro-active material together, wherein the binder is in an amount of from 0.01% to 90% by weight of the total electrode weight. Preferably, the binder is in an amount of from 0.5% to 50% and, most preferably, from 1% to 15%.

Another preferred embodiment of the present invention is a precursor solution or suspension to the graphene polymer binder. This precursor contains a graphene polymer dissolved or dispersed in a liquid medium. Still another embodiment of the present invention is a precursor paste containing multiple particles of an electro-active material and a graphene polymer wherein the electro-active material and the graphene polymer are dispersed or dissolved in a liquid medium. Yet another embodiment of the present invention is a battery or supercapacitor containing a conductive electrode as described above.

Another embodiment of the present invention is a method of producing a conductive electrode, including the steps of: (a) preparing a precursor solution or suspension wherein a graphene polymer is dissolved or dispersed in a liquid medium; (b) mixing multiple particles of an electro-active material in the precursor solution or suspension to form a slurry or paste; (c) applying a coating of the slurry or paste onto a current collector; and (d) removing the liquid medium from the coating to form the desired solid electrode.

There are several ways of producing the presently invented solution or suspension as a precursor to the conductive graphene polymer binder. Examples include: (1) Preparing oxidized graphene polymer or graphene oxide (GO) polymer and re-dispersing GO polymer in a liquid; (2) Preparing pristine graphene polymers and dispersing these polymers in an acid solution; (3) Preparing pristine graphene polymer, oxidizing pristine graphene and dispersing the oxidized graphene in a liquid medium; and (4) preparing oxidized graphene polymer solution and chemically reducing the GO polymer. Details of these processes are given at a later section. The acid used in the above processes is preferably an environmentally benign acid selected from the group consisting of formic acid, acetic acid, citric acid, carboxylic acid, and combinations thereof.

The pristine or un-oxidized NGP material is preferably produced by one of the following three processes: (A) intercalating the graphitic material with a non-oxidizing agent, followed by a thermal or chemical exfoliation treatment in a non-oxidizing environment; (B) subjecting the graphitic material to a supercritical fluid environment for inter-graphene layer penetration and exfoliation; or (C) dispersing the graphitic material in a powder form to an aqueous solution containing a surfactant or dispersing agent to obtain a suspension and subjecting the suspension to direct ultrasonication. The details of these procedures are presented at a later section.

For the purpose of facilitating discussion, we may define the graphene polymer having an oxygen content higher than 15% by weight as graphene oxide (GO) polymer and that having an oxygen content lower than approximately 15% as graphene. The pristine nano graphene refers to the graphene polymer that has an oxygen content less than 1% by weight. Hence, the present invention provides GO (>15% by wt. of O), graphene ($\leq$15% by wt. of O), and pristine graphene polymers ($\leq$1% by wt. of O).

The graphene polymer prepared in a solution or suspension form can be formed directly into a thin film with a thickness no greater than 100 nm, typically maintaining an electrical conductivity of at least 100 S/cm and, in many cases, greater than 1,000 S/cm. With an oxygen content no greater than 25% by weight, typically the graphene polymer thin film exhibits an electrical conductivity no less than 1 S/cm.

For the preparation of an electrochemical cell electrode, multiple particles of an electro-active material may be added to a binder solution or suspension prepared according to any one of the above-described processes to obtain a slurry or paste. A desired amount of the slurry or paste is then coated onto a current collector, allowing the liquid to evaporate and leaving behind an electrode bonded to a surface of a current collector. In the studies that led to the surprising results of the present invention, the electrical and thermal conductivities of the electrodes containing a range of conductive binder proportions were measured.

The graphitic material, for the preparation of graphene, may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), graphitized soft carbon, hard carbon, and combinations thereof MCMBs or CMS are usually obtained from a petroleum heavy oil or pitch, coal tar pitch, or polynuclear hydrocarbon material (highly aromatic molecules). When such a precursor pitch material is carbonized by heat treatment at 400° to 550°, micro-crystals called mesophase micro-spheres are formed in a non-crystalline pitch matrix. These mesophase micro-spheres, after being isolated from the pitch matrix (which is typically soluble in selected solvents), are often referred to as meso-carbon micro-beads (MCMB). The MCMBs commercially available are those that have been subjected to a further heat treatment at a temperature in the range of 2,500° C. and 3,000° C.

In many cases, the graphene polymer produced in our studies, if allowed to precipitate out of the solution or suspension state to form NGPs, has a specific surface area in the range of approximately 300 $m^2/g$ to 2,600 $m^2/g$. The NGPs obtained with the presently invented process tend to contain a significant proportion of single-layer graphene (with a thickness of 0.34-0.4 nm) or graphene of few layers (<2 nm). The graphene polymer in a dry state can form a sheet with a length or width typically in the range of 10 nm to 20 µm, but more typically in the range of 100 nm to 10 µm.

The graphene polymer prepared from pristine graphene according to the presently invented process, although having a minimal amount of oxygen-containing groups (hence, remain highly conducting), become soluble or dispersible in water and several other organic solvents, such as methanol, ethanol, acetone, NMP, toluene, and various acids. The graphene polymer can be further functionalized by carrying out an additional step of contacting the lightly oxidized NGP obtained in step (b) with a reactant such that a functional group is added to a surface or edge of the graphene sheet or platelet, wherein the functional group is selected from alkyl or aryl silane, alkyl or aralkyl group, hydroxyl group, amine group, fluorocarbon, or a combination thereof.

DETAILED DESCRIPTION OF PREFERRED EMBODIMENTS

Figure 1:
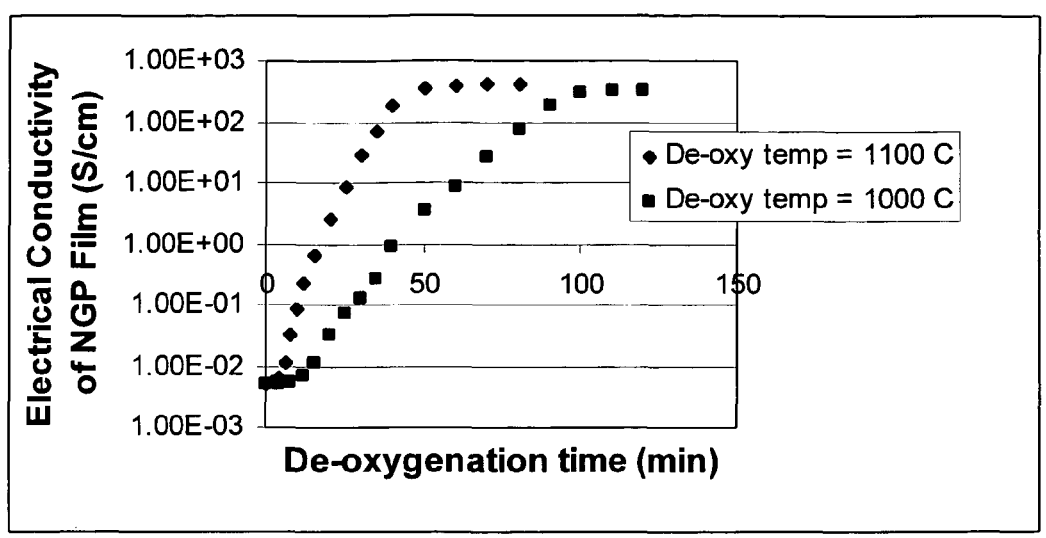
FIG. 1 Electrical conductivity data of the thin films made from GO nano platelets after various periods of de-oxygenation time at 1,000° C. and 1,100° C., respectively.

The present invention provides an electrically conductive electrode for an electrochemical cell, such as a lithium ion battery, lithium metal battery, lithium-air battery, other alkali or alkaline battery, or supercapacitor. In one preferred embodiment, the electrode comprises multiple particles of an electro-active material (e.g., Si or graphite particles in an anode and lithium iron phosphate particles in a cathode of a lithium ion battery, or activated carbon particles in a super-capacitor) and a conductive graphene polymer binder that bonds multiple particles of the electro-active material together, wherein the binder is in an amount of from 0.01% to 90% by weight of the total electrode weight. Preferably, the binder is in an amount of from 0.5% to 50% and, most preferably, from 1% to 15%.

Another preferred embodiment of the present invention is a precursor solution or suspension to the graphene polymer binder. This precursor contains a graphene polymer dissolved or dispersed in a liquid medium. The graphene polymer can be a substantially pristine graphene, relatively free from other non-carbon elements (e.g., oxygen, hydrogen, and fluorine) or a graphene oxide, graphene fluoride, graphene hydride containing a controlled amount of oxygen, fluorine, or hydrogen, respectively.

The aforementioned binder precursor solution or suspension can be used to prepare an electrode of the present invention. Specifically, another embodiment of the present invention is a method of producing a conductive electrode, including the steps of: (a) preparing a precursor solution or suspension wherein a graphene polymer is dissolved or dispersed in a liquid medium; (b) mixing multiple particles of an electro-active material in the precursor solution or suspension to form a slurry or paste; (c) applying a coating of the slurry or paste onto a current collector; and (d) removing the liquid medium from the coating to form the desired solid electrode. Hence, still another embodiment of the present invention is a slurry or paste that contains an electroactive material and graphene polymer dissolved or dispersed in a liquid medium.

There are several ways of producing the presently invented solution or suspension as a precursor to the conductive graphene polymer binder. The following examples are presented to illustrate the preferred processes, which are not to be construed as defining the limit to the scope of the present invention:

(1) Preparation of Oxidized Graphene Polymer or Graphene Oxide Polymer-Containing Binder Precursor The first process entails:
(a) dispersing or immersing a laminar graphite material (e.g., graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms;
(c) re-dispersing the exfoliated graphite to a liquid medium containing an acid (e.g., sulfuric acid), an oxidizing agent (e.g. nitric acid), or an organic solvent (e.g., NMP) at a desired temperature for a duration of time until the exfoliated graphite is converted into a graphene oxide polymer dissolved in the liquid medium. The acid is preferably a weak acid (such as diluted sulfuric acid) or a more environmentally benign acid, such as formic acid, acetic acid, citric acid, carboxylic acid, and combinations thereof. We were pleasantly surprised to observe that exfoliated graphite, when dispersed in these acids, was gradually dispersed and essentially dissolved to form a graphene polymer solution. Although not a required operation, stirring, mechanical shearing, or ultrasonication can be used to accelerate the dispersion and dissolution step.

The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anhydrides thereof, reactive carboxylic acid derivatives thereof, and combinations thereof. The most preferred carboxylic acids are formic acid and acetic acid.

Alternatively, prior to step (c) above, the exfoliated graphite or graphite worms obtained in step (b) above may be broken up to obtain isolated or separated expanded graphite particles (graphite flakes) and/or NGPs using mechanical shearing or ultrasonication. These graphite flakes or NGPs are then re-dispersed in acid to obtain the desired suspension or solution. This process is hereinafter referred to as the second process.

(2) Preparation of a Binder Precursor from Pristine Graphene Polymers

As the third process, a precursor binder solution or suspension may be prepared as follows:
(a) Preparing a suspension containing pristine nano graphene platelets (NGPs) dispersed in a liquid medium using, for instance, direct ultrasonication (e.g., a process disclosed by us in U.S. patent application Ser. No. 11/800,728 (May 8, 2007));
(b) Optionally removing some of the liquid from the suspension;
(c) Adding a desired amount of acid or organic solvent to the suspension at a temperature for a desired period of time to obtain a binder precursor suspension or solution.

(3) Preparation of Oxidized or Fluorinated Graphene Polymer-Based Binder Precursor from Pristine Graphene Polymer As a fourth process, a precursor binder solution may be prepared as follows:
(a) Preparing pristine NGP powder using, for instance, direct ultrasonication (e.g., a process disclosed by us in U.S. patent application Ser. No. 11/800,728 (May 8, 2007));
(b) Subjecting the pristine NGP powder to an oxidation or fluorination treatment to obtain oxidized NGPs (e.g., by exposing the NGP powder to a gaseous oxygen or fluorine environment at an elevated temperature (e.g. >350° C. for oxidation and >150° C. for fluorination) for a desired period of time);
(c) Dispersing oxidized or fluorinated NGPs in an acid solution at a temperature for a desired period of time to obtain a binder precursor suspension or solution, wherein the resulting graphene polymer has an oxygen content preferably no greater than 25% by weight.

(4) Preparation and Reduction of Oxidized Graphene Polymer or Graphene Oxide Polymer-Containing Binder Precursor The fifth process includes:
(a) Dispersing or immersing a laminar graphite material (e.g., graphite powder) in a mixture of an intercalant and an oxidant (e.g., concentrated sulfuric acid, nitric acid, and potassium permanganate) at a temperature for a length of time sufficient to obtain a graphite oxide (GO) solution;
(b) Adding a desired amount of a chemical reducing agent to the GO solution to at least partially reduce GO to a graphene polymer dissolved or suspended in the solution.

For the preparation of an electrochemical cell electrode, multiple particles of an electro-active material are then added to a binder solution or suspension prepared according to any one of the above-described processes or their variations to obtain a slurry or paste. A desired amount of the slurry or paste is then coated onto a current collector, allowing the liquid to evaporate and leaving behind an electrode bonded to a surface of a current electrode. For examples, lithium cobalt oxide particles may be added to a solution containing a graphene polymer dispersed in a solvent (NMP). The resulting paste may be coated onto an aluminum foil as a current collector to form a coating layer of 50-500 µm thick. By allowing the solvent to vaporize one obtains a positive electrode (cathode) for a lithium ion battery.

In the aforementioned examples, the starting material for the preparation of a graphene polymer is a graphitic material selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

In the aforementioned third process, the oxidation treatment comprises subjecting the pristine graphene material to an oxidizing agent preferably selected from ozone, sulfonic ($SO_3$) vapor, an oxygen-containing gas, hydrogen peroxide vapor, nitric acid vapor, or a combination thereof. Preferably, the treatment comprises subjecting the pristine NGP material to an oxidizing agent in a hydrogen-containing environment. Alternatively, oxidation treatment can be conducted by immersing graphene polymer powders or NGPs in a liquid acid and/or oxidizer environment.

A primary goal of the oxidation treatment is to impart solubility or dispersibility to the obtained pristine graphene polymer without a significant compromise in electrical conductivity. After an extensive and in-depth study we have come to discover that dispersible and conductive NGPs can be produced with an oxygen content no greater than 25% by weight, preferably below 20% by weight, further preferably between 5% and 20% by weight. The oxygen content can be determined using chemical elemental analysis and/or X-ray photoelectron spectroscopy (XPS).

The present invention provides a process for producing soluble or dispersible graphene polymers that are highly conducting. The electrical conductivity of graphene polymers in the present context was measured after the graphene polymers were precipitated out as discrete nano graphene sheets, which were formed into a thin film approximately 100 nm in thickness. In one preferred embodiment, the process comprises: (a) preparing a pristine graphene polymer (e.g., in a solid NGP powder form) from a graphitic material; and (b) subjecting the pristine graphene material to an oxidation treatment to obtain the dispersible NGP material, wherein the NGP material has an oxygen content no greater than 25% by weight. Preferably, the NGP material has an oxygen content no less than 5% by weight. A particularly useful oxygen content range is from approximately 10% to 20% by weight inclusive. These oxidized NGPs are then dispersed or dissolved in a liquid medium to form a precursor suspension or solution.

The processes are described in further details as follows:
Preparation of Pristine NGPs The pristine NGP material is preferably produced by a process comprising a procedure selected from: (A) intercalating the graphitic material with a non-oxidizing agent, followed by a thermal or chemical exfoliation treatment in a non-oxidizing environment; (B) subjecting the graphitic material to a supercritical fluid environment for inter-graphene layer penetration and exfoliation; or (C) dispersing the graphitic material in a powder form to an aqueous solution containing a surfactant or dispersing agent to obtain a suspension and subjecting said suspension to direct ultrasonication. Any one of these three procedures will lead to the production of pristine or un-oxidized NGPs. Preferred modes of practicing these three procedures are discussed in more detail as follows:

Procedure (A):

In Procedure (A), a particularly preferred step comprises (i) intercalating the graphitic material with a non-oxidizing agent, selected from an alkali metal (e.g., potassium, sodium, lithium, or cesium), alkaline metal, or an alloy, mixture, or eutectic of an alkali or alkaline earth metal; and (ii) a chemical exfoliation treatment (e.g., by immersing K-intercalated graphite in ethanol solution).

In addition to alkali metals (e.g. Li, Na, K, Rb, Cs) and alkaline earth metals (e.g. Mg, Ca, Sr, Ba), elements such as Eu, Yb, Ti, and halogen (Cl, F, I, etc.) can be used to intercalate the starting graphitic material. Intercalation of these elements can be carried out by several different routes. First, these elements can be intercalated electrochemically using a non-aqueous solvent. Second, an alkali plus naphthalene or benzophenone can be used with a suitable non-aqueous solvent (e.g., tetrahydrofuran). Third, any of the aforementioned metals can be intercalated by dissolving in a liquid ammonia solution to create solvated ions. Fourth, lithium can be intercalated by using n-butyl lithium in a hydrocarbon solvent (e.g., hexane). Fifth, element, such as K, or an eutectic of K, can be heated above its melting or eutectic point, enabling the melt to intercalate into inter-graphene spaces. Six, the graphitic material can be exposed to a halogen element or halogen compound sealed in a vessel or a two-chamber vessel (one chamber containing the graphitic material in a fine powder form and the other containing the halogen). The first five approaches were mentioned in Mack, et al. [Mack, J. J. et al. Chemical manufacture of nanostructured materials. U.S. Pat. No. 6,872,330 (Mar. 29, 2005)].

For instance, natural flake graphite can be heated to 200° C. in an evacuated container in the presence of potassium to form a first stage intercalation compound. By immersing this intercalation compound in ethanol, graphite is exfoliated with resulting graphene sheets dispersed in ethanol. Lithium can be intercalated at higher temperatures and/or pressures. Intercalation using the alkaline earth (Ca, Ba, Sr) or lanthanide metals (Eu, Yb, Sm, Tm) also requires high temperatures and long reaction times. Any solvent that contains water can be used for exfoliation, including organic solvents that have not been thoroughly dried. This includes water, alcohols, or other hydroxylic solvents (including carboxylic acids), or any combination thereof. Although Mack, et al. prepared NGPs using the alkali metal intercalation approach, they did not teach about modifying NGPs for solubility, nor did they measure the electrical conductivity of NGPs.

Procedure (B):

Procedure (B) involves delaminating a graphitic material with a supercritical fluid or, analogous to a prior art approach, with a coating agent solubilized in a supercritical fluid. It is known that, if a substance is heated above its critical temperature (Tc) and pressurized above its critical pressure (Pc), it becomes a supercritical fluid. Supercritical fluids are known to provide favorable means to achieve solvating properties, which have both gas and liquid characteristics without actually changing a chemical structure. By proper control of pressure and temperature, a significant range of physicochemical properties (density, diffusivity, dielectric constants, viscosity, and surface free energy) can be accessed without passing through a phase boundary, e.g., changing from gas to liquid form.

As an example, carbon dioxide may exist as a supercritical fluid having properties of both a liquid and a gas when above its critical temperature (>31° C.) and critical pressure (>7.4 MPa). Carbon dioxide under supercritical conditions exhibits both a gaseous property, being able to penetrate through many materials and a liquid property, being able to dissolve materials into their components. Although carbon dioxide is a preferred medium, the supercritical fluid may be selected from other suitable species, such as water, hydrogen peroxide, ozone, water oxidation, methane, ethane, ethylene, or a mixture thereof.

A conventional approach is herein discussed first, which can be used to prepare non-oxidized NGPs. This will be followed by a discussion on an innovative method developed in our research laboratory. The pristine NGPs prepared will then be subjected to a controlled oxidation treatment to produce dispersible or soluble NGPs that remain highly conductive. As suggested by Gulari, et al. [E. Gulari, et al., "Method of Delaminating a Graphite Structure with a Coating Agent in a Supercritical Fluid," U.S. Pat. No. 7,157,517 (Jan. 2, 2007], one may choose to use a coating agent that can be solubilized in the supercritical fluid to diffuse between the graphite layers. The purpose of this coating agent, according to Gulari, et al. was to allow the coating agent to expand or swell the interstitial spaces between graphene layers (to assist in intercalation and exfoliation) and, after de-pressurization, the coating agent will precipitate out to surround and isolate the exfoliated graphene platelets. This coating agent (e.g., a polymer) will eventually become a part (the matrix) of a composite material. Generally, the coating agent may include a polymer, oligomer, monomer, or oil. In one embodiment, the coating agent is poly-(dimethyl siloxane) ("PDMS") having a weight average molecular weight of preferably between about 30,000 and 200,000 g/mole. Other suitable coating agents include poly-(tetrafluoroethylene-co-hexafluoropropylene), poly-(perfluoro-propylene oxide), poly-(diethyl-siloxane), poly-(dimethylsilicone), poly-(phenylmethylsilicone), perfluoroalkylpolyethers, chlorotrifluoroethylene, and bromotrifluoroethylene.

The graphitic material particles and the coating agent are preferably placed in a compartment of a high pressure vessel isolatable from the atmosphere. In this embodiment, the graphite particles comprise about 23 to 83 weight percent and the coating agent comprises about 77 to 17 weight percent of material placed in the vessel. The weight ratio of graphite particles to coating agent is preferably at least about 1:10. Then, the compartment is sealed off from the atmosphere. The compartment may be isolated by any conventional means. This is followed by introducing high-pressure carbon dioxide into the compartment with $CO_2$ being pressurized in the vessel to preferably above approximately 1,070 to 10,000 psig (7.4 MPa to 69 MPa). Then, the vessel is heated to a temperature preferably above about 40° C., and preferably above 70° C. These conditions define a supercritical condition of carbon dioxide whereby the coating agent is solubilized in the supercritical carbon dioxide. Pressurizing and heating the graphitic particles with the supercritical fluid may be accomplished by any conventional means. For instance, the vessel may be heated by a heating jacket or electrical heating tape disposed around the vessel.

With the coating agent being solubilized in the supercritical fluid, the coating agent diffuses into inter-graphene spaces to possibly expand or swell these spaces. The step of diffusing the coating agent between the graphene layers includes maintaining diffusion for between about 10 minutes to 24 hours (preferably 3 hours) at supercritical conditions to produce tentatively intercalated graphite.

The procedure further comprises catastrophically depressurizing the tentatively intercalated graphite to precipitate the coating agent from the supercritical fluid. During catastrophic depressurization, the supercritical fluid expands and exfoliates the graphite layers while the coating, agent precipitates from the supercritical fluid to cover the layers. The depressurization step comprises immediately depressurizing the vessel down to a considerably lower pressure, preferably ambient pressure. This may be accomplished in a time period of between about 5 and 30 seconds, and preferably 15 seconds. This is accomplished by depressurizing the pressure vessel at a rate of between about 0.1 and 5.0 milliliters per second, and preferably 3.0 milliliters per second. The pressure decrease may be accomplished by opening the compartment to the atmosphere. As immediate depressurization occurs, the graphite layers are delaminated apart from one another.

Presumably, the low viscosity and high diffusivity of the supercritical fluid allows the coating agent solubilized therein to become disposed or intercalated between the graphene layers in the graphitic material under supercritical conditions, thereby increasing the interlayer spacing. Upon depressurization, the supercritical fluid disposed in the interstitial spaces force the layers to exfoliate or delaminate from each other, and the coating agent previously solubilized in the supercritical fluid precipitates therefrom to deposit on the delaminated layers, preventing reformation of the van der Waals forces between graphene layers. That is, the coating agent precipitates from the supercritical fluid and attaches to the graphene layers.

Although this conventional route is useful in terms of producing pristine NGPs that are covered with a coating agent, one has to remove this coating agent unless the coating agent is desired for an intended application (e.g., for the preparation of a polymer matrix composite with the coating agent being the monomer or polymer for this matrix). After an extensive study, we have surprisingly observed that:

(1) Supercritical fluids containing no coating agent are at least as effective as those containing a coating agent for intercalating and exfoliating natural graphite. There is no major difference in the supercritical fluid temperature, pressure, time, and de-pressurization conditions between the two species (one with and the other without a coating agent);

(2) Supercritical fluids, with or without a coating agent therein, are effective in intercalating and exfoliating a wide variety of graphitic materials, including (in addition to natural graphite) artificial graphite (e.g., highly oriented pyrolytic graphite, HOPG), graphite oxide, graphite fluoride, graphite fiber, carbon fiber, carbon nano-fiber, carbon nano-tube, mesophase carbon microbead (MCMB), graphitized soft carbon, and hard carbon. Previous studies on supercritical fluid delamination of graphite have been essentially limited to chemically pre-intercalated natural graphite [D. M. Kaschak, et al., "Graphite Intercalation and Exfoliation Process," U.S. Pat. No. 7,105,108 (Sep. 12, 2006)] and natural flake graphite [Gulari et al].

(3) With proper conditions for supercritical fluid intercalation and exfoliation via de-pressurization, one could readily obtain ultra-thin NGPs with a thickness less than 1 nm. With other less favorable conditions (e.g., a slower de-pressurization rate), somewhat thicker NGPs were obtained. However, these thicker NGPs could be subjected to another cycle of supercritical fluid intercalation and exfoliation, preferably in the same pressure chamber, to yield much thinner NGPs. By repeating the process one or two times we could readily obtain substantially single-layer NGPs.

Procedure (C):

Another alternative procedure for exfoliating a graphitic material to produce pristine NGPs comprises (a) dispersing graphitic material particles in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets.

Preferably, the ultrasonication step is conducted at a temperature lower than 100° C. The energy level is typically greater than 80 watts. The liquid medium may comprise water, organic solvent, alcohol, a monomer, an oligomer, or a resin. The graphitic material could be natural graphite, synthetic graphite, highly oriented pyrolytic graphite, graphite oxide, graphite fiber, graphite nano-fiber, MCMB, soft carbon, hard carbon, or a combination thereof.

It may be noted that ultrasonication has been used to successfully separate graphite flakes after thermal exfoliation of chemically intercalated and oxidized graphite. However, there has been no report on the utilization of ultrasonic waves in directly exfoliating graphite (without intercalation) and, concurrently, separating exfoliated particles into isolated or separated graphite flakes or platelets with a thickness less than 100 nm. This direct graphite exfoliation procedure was discussed in detail in one of our earlier inventions [Aruna Zhamu, Jinjun Shi, Jiusheng Guo and Bor Z. Jang, "Method of Producing Exfoliated Graphite, Flexible Graphite, and Nano-Scaled Graphene Plates," Pending, U.S. patent Ser. No. 11/800,728 (May 8, 2007)].

Controlled Oxidation of Pristine NGPs

In one preferred embodiment of the present invention, the second step of the process involves subjecting the pristine NGPs to a controlled oxidation treatment. As opposed to the original chemical intercalation/oxidation treatment required in the prior art preparation of graphite oxide nano platelets that involves heavy and essentially un-controlled oxidation of natural graphite, the present oxidation procedure for pristine NGPs has the following advantages: (1) Oxidation can be executed in a well-controlled manner; (2) The degree of oxidation can be relatively low (in such a manner that oxidation can be limited to the edge of NGPs, with the graphene plane surface remaining substantially oxygen-free, if so desired); (3) The oxidation procedure can proceed at a high rate since the original graphitic material has been split into smaller particles and, hence, the oxidizing agent does not have to travel through inter-particle regions; and (4) Due to the well-split and separated nature of NGPs, they can be subjected to gaseous phase oxidation, as opposed to liquid phase oxidation that requires a post-oxidation cleaning or purification procedure, which is typically very tedious and generates a great amount of waste water.

In one procedure, pristine NGPs may be dispersed in an acid (e.g., sulfuric acid, nitric acid, carboxylic acid, acetic acid, formic acid, etc.) and/or an oxidizing agent (e.g., $KMnO_4$, sodium or potassium chlorate, and hydrogen peroxide, $H_2O_2$) at a temperature for a desired period of time. More environmentally benign acids or oxidizers, such as carboxylic acid, acetic acid, formic acid, and hydrogen peroxide, are preferred. The carboxylic acid may be selected from the group consisting of aromatic carboxylic acid, aliphatic or cyclo-aliphatic carboxylic acid, straight chain or branched chain carboxylic acid, saturated and unsaturated mono-carboxylic acids, di-carboxylic acids and poly-carboxylic acids that have 1-10 carbon atoms, alkyl esters thereof, and combinations thereof.

Alternatively and preferably, the oxidation treatment comprises subjecting the pristine NGPs to an oxidizing agent in a vaporous or gaseous state. This oxidizing agent is preferably selected from ozone, sulfonic ($SO_3$) vapor, an oxygen-containing gas, hydrogen peroxide vapor, nitric acid vapor, or a combination thereof. Further preferably, the treatment comprises subjecting the pristine NGP material to an oxidizing agent in a hydrogen-containing environment. Hydrogen seems to provide useful functional groups, such as carboxyl and hydroxyl. An oxidation treatment can be conducted by immersing NGPs in a liquid acid and/or oxidizer environment. Alternatively, an oxidation treatment can be conducted in a gaseous treatment.

A primary goal of the oxidation treatment is to impart solubility or dispersibility to the pristine NGPs without a significant compromise in electrical conductivity. After an extensive and in-depth study we have discovered that dispersible and conductive NGPs can be achieved by producing pristine NGPs first and then imparting to pristine NGPs an oxygen content up to 25% by weight, preferably below 20% by weight, further preferably between 5% and 20% by weight. The oxygen content can be determined using chemical elemental analysis and/or X-ray photoelectron spectroscopy (XPS).

It has been hitherto commonly believed by those skilled in the art that chemical processibility and electrical conductivity of graphite materials are mutually exclusive. Quite opposite to this common wisdom, we have herein proven that, within a reasonable range of oxygen contents in NGPs and their associated window of processing conditions, these two features can be achieved at the same time. The good solubility or dispersibility enables the production of a graphene polymer solution or suspension. The oxygen content, along with some hydrogen, also enables us to impart a wide variety of functional groups to the graphene polymers.

The laminar graphite materials used in the prior art processes for the production of the GIC, GO, and subsequently made exfoliated graphite, flexible graphite sheets, and graphene platelets were, in most cases, natural graphite. However, the present invention is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

The presently invented process typically resulted in a dispersible nano graphene material, when formed into a thin film with a thickness no greater than 100 nm, exhibits an electrical conductivity of at least 10 S/cm, often higher than 100 S/cm, and, in many cases, higher than 1,000 S/cm. The resulting NGP powder material typically has a specific surface area of from approximately 300 $m^2/g$ to 2,600 $m^2/g$ and, in many cases, comprises single-layer graphene sheets.

The process may further comprise a step of contacting the nano graphene platelet material, during and/or after oxidation, with a reactant such that a functional group is added to a surface or edge of the nano graphene platelet material. Theses functional groups may contain alkyl or aryl silane, alkyl or aralkyl group, hydroxyl group, carboxyl group, amine group, sulfonate group (—$SO_3H$), aldehydic group, quinoidal, fluorocarbon, or a combination thereof.

The following examples serve to provide the best modes of practice for the present invention and should not be construed as limiting the scope of the invention. Examples 1-4 provide illustrative examples that are based on the preparation of graphite oxide (GO) and then de-oxygenation of GO materials. Subsequent examples provide samples that are prepared according to another preferred embodiment of the present invention—preparation of pristine NGPs, followed by partial oxidation.

Example 1

Graphene from Carbon/Graphite Fibers

Continuous graphite fiber yarns (Magnamite from Hercules) were cut into segments of 5 mm long and then ball-milled for 24 hours. Approximately 20 grams of these milled fibers were immersed in a mixture of 2 L of formic acid and 0.1 L of hydrogen peroxide at 45° C. for 48 hours. Following the chemical oxidation intercalation treatment, the resulting intercalated fibers were washed with water and dried. The resulting product is a formic acid-intercalated graphite fiber material containing graphite oxide crystallites.

Subsequently, approximately ½ of the intercalated or oxidized fiber sample was transferred to a furnace pre-set at a temperature of 600° C. for 30 seconds. The compound was found to induce extremely rapid and high expansions of graphite crystallites. The as-exfoliated graphite fiber is designated as Sample-1a. Approximately half of Sample 1-a material was subjected to de-oxygenation at 1,100° C. for 20 minutes in a nitrogen atmosphere to obtain Sample-1b.

A small amount of both materials was mixed with an aqueous ethanol solution to form two separate suspensions, which were subjected to further separation of exfoliated flakes using a Cowles shearing device. Both graphite oxide platelets (Sample 1-a) and reduced GO platelets (essentially NGPs) were found to be soluble and well-dispersed in this aqueous solution. The resulting suspensions were dip-coated to form thin films with a thickness of approximately 100 nm on glass slide surfaces.

A four-point probe method was used to measure the electrical conductivity of the thin films on the glass substrate. It was found that the conductivity of the film prepared from Sample 1-a (as-exfoliated GO platelets) was approximately $1.3\times10^{-3}$ S/cm while that of Sample 1-b was 2.8 S/cm.

The GO or NGP powder was re-dispersed in a mixture of 2 L of formic acid and 0.1 L of hydrogen peroxide at 45° C. for 24 hours to obtain a precursor suspension for the subsequent preparation of an electrochemical electrode.

Example 2

Graphene Oxide from Sulfuric Acid Intercalation and Exfoliation of MCMBs, Followed by De-Oxygenation of MCMBs MCMB 2528 microbeads were supplied by Alumina Trading, which was the U.S. distributor for the supplier, Osaka Gas Chemical Company of Japan. This material has a density of about 2.24 $g/cm^3$; a particle size maximum for at least 95% by weight of the particles of 37 microns; median size of about 22.5 microns and an inter-planar distance of about 0.336 nm. MCMB 2528 (10 grams) were intercalated with an acid solution (sulfuric acid, nitric acid, and potassium permanganate at a ratio of 4:1:0.05) for 24 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The dried powder sample was placed in a quartz tube and inserted into a horizontal tube furnace pre-set at a desired temperature, 600° C. for 30 seconds to obtain Sample 2-a. Approximately one half of the exfoliated MCMB sample was subjected to de-oxygenation treatment at 1,250° C. for 15 minutes in an argon environment to obtain Sample 2-b. A small quantity of each sample was mixed with water and ultrasonicated at a 60 W power for 10 minutes to obtain a suspension. Again, thin films were prepared from each suspension by dip coating and the electrical conductivity of the films was measured. The conductivity of the film prepared from Sample 2-a (as-exfoliated oxidized MCMB platelets) was found to be approximately $1.8\times10^{-2}$ S/cm and that of Sample 2-b after de-oxygenation was 67 S/cm. Both types of graphene were well-dispersed in water. The water suspension was used for subsequent preparation of a paste containing electro-active material particles.

Example 3

Oxidation, Exfoliation, and De-Oxygenation of Natural Graphite

Graphite oxide was prepared by oxidation of graphite flakes with sulfuric acid, sodium nitrate, and potassium permanganate at a ratio of 4:1:0.05 at 30° C. for 24 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å), indicating that graphite has been converted into graphite oxide.

The dried, intercalated (oxidized) compound was divided into two batches, both for exfoliation at 800° C. for 1 minute by placing the sample in a quartz tube that was inserted into a horizontal tube furnace pre-set at 800° C. For Sample 3-a, exfoliation was followed by de-oxygenation at 1,000° C. for various periods of time, from 1 minute to 120 minutes. For Sample 3-b, the de-oxygenation temperature was 1,100° C., from 1 minute to 80 minutes. The de-oxygenation atmosphere was approximately 95% nitrogen and 5% hydrogen.

Two series of thin films were prepared from these two samples for the purpose of measuring the electrical conductivity of the GO nano platelets or NGPs as a function of the de-oxygenation time and the resulting oxygen content. The oxygen content, based on the elemental analysis, was for those oxygen atoms in functional groups attached to the plane surfaces and edges of the platelets. The exfoliated and de-oxygenated products, after various periods of de-oxygenation, were each mixed with water and then subjected to a mechanical shearing treatment using a Cowles rotating-blade shearing machine for 20 minutes. Spin coating was used to prepare thin films for conductivity measurement. GO or graphene platelets at selected de-oxygenation time intervals were also analyzed for their oxygen contents using X-ray photoelectron spectroscopy (XPS) available at the Center for Multifunctional Nonmaterial at Wright State University, Dayton, Ohio.

Shown in FIG. 1 is a summary of the electrical conductivity data of the films made from GO nano platelets after various periods of de-oxygenation time at 1,000° C. and 1,100° C., respectively. The conductivity of the film varies from $5.0 \times 10^{-3}$ S/cm of as-foliated GO to 180 S/cm after 40 minutes of de-oxygenation, and to $4.1 \times 10^2$ S/cm after 80 minutes, the latter representing a five order-of-magnitude improvement in electrical conductivity. The GO or de-oxygenated GO platelets were found to be soluble or dispersible in water up to an oxygen content of 5.6% by weight (after 50 minutes at 1,100° C., giving rise to an electrical conductivity of 360 S/cm). This conductivity value is a very impressive result, comparable to the best achievable conductivity with strong or heavy chemical reduction and/or vacuum de-oxygenation treatments after the films were made (yet those graphene platelets of the thin films prepared in the prior art became non-dispersible) [e.g. S. Stankovich, et al. "Synthesis and exfoliation of isocyanate-treated graphene oxide nanoplatelets," Carbon 44, 3342-3347 (2006); and D. Li, et al "Processable aqueous dispersions of graphene nanosheets," Nature Nanotechnology 3, 101-105 (2008)].

The two curves and the observations made on the solution dispersibility of the corresponding suspensions appear to indicate that the conductivity increases rapidly with the degree of de-oxygenation while the GO platelets remain soluble over a range of treatment time durations at a given de-oxygenation temperature; e.g., up to 50 minutes at 1,100° C. Once the conductivity value reaches a plateau, the platelets begin to lose their solubility or dispersibility in water and other polar solvents, such as ethanol and acetone. Fortunately, this plateau value is already very high, typically in the range of 100-1,000 S/cm.

Figure 2:
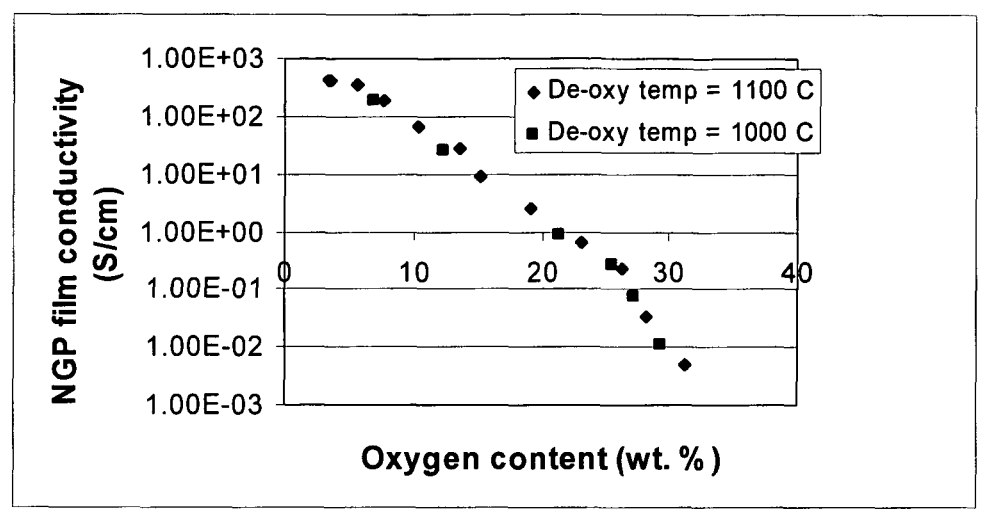
FIG. 2 Electrical conductivity data plotted as a function of the corresponding oxygen content in GO nano platelets prepared at two de-oxygenation temperatures.

The electrical conductivity data were plotted as a function of the corresponding oxygen content data for two de-oxygenation temperatures, as shown in FIG. 2. It is clear that, regardless of the de-oxygenation temperature, it is the final oxygen content that governs the conductivity of GO or reduced GO platelets; the lower the oxygen content, the higher the conductivity is. When the oxygen content is below 5% by weight, the reduced GO tends to become insoluble or non-dispersible in water. Surprisingly, and fortunately, within the oxygen content range of 5%-20%, the nano platelet film exhibits a conductivity value greater than 1 S/cm. If the oxygen content is below 15%, the conductivity is greater than 10 S/cm. The conductivity of the NGP film is greater than 100 S/cm if oxygen content is below 10%.

The graphene oxide powder obtained above was re-dispersed in a formic acid and stirred for 24 hours to produce graphene polymer-containing precursor solutions, which were later used to make electrodes.

Example 4

Figure 3:
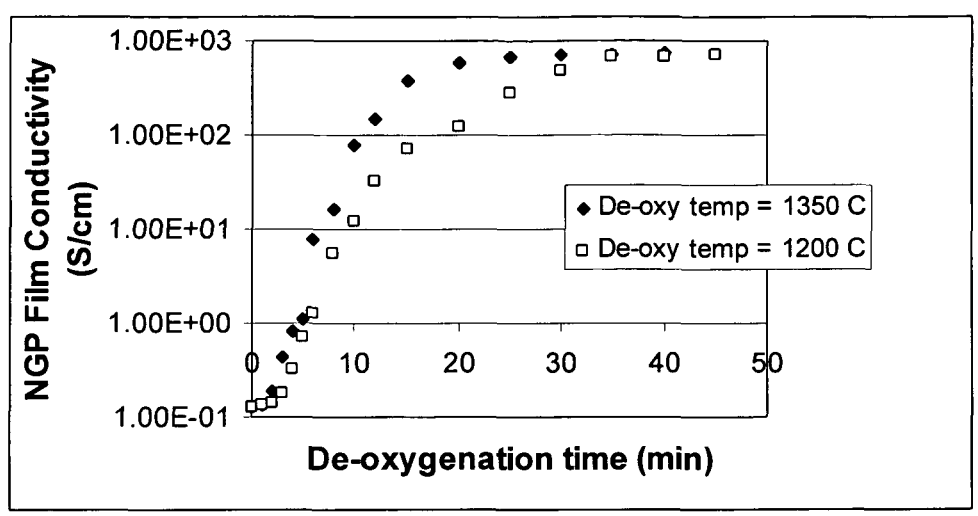
FIG. 3 Electrical conductivity data of GO nano platelet films after various periods of platelet de-oxygenation time at 1,200° C. and 1,350° C.

Oxidation, Exfoliation, De-Oxygenation, and Further Functionalization of Natural Graphite The samples of Example 4, including Sample 4-a and 4-b, were prepared in a similar manner as described in Example 3, but the exfoliation was conducted at 1,000° C. for 45 seconds, followed by de-oxygenation at 1,200° C. and 1,350° C., respectively, for various periods of time. Shown in FIG. 3 is a summary of the electrical conductivity data of the films made from GO nano platelets after various periods of de-oxygenation time. These data further confirm the trend observed earlier that the electrical conductivity of nano graphene or graphene oxide films increases with increasing de-oxygenation time (or decreasing oxygen content). High conductivity can be attained with shorter periods of time if the de-oxygenation temperature is sufficiently high.

In order to determine if a lower oxygen content would adversely affect the functionalization capability of graphene platelets and how functionalization would impact the electrical conductivity of these platelets, we carried out additional work on selected samples, described below: With the de-oxygenation atmosphere containing some hydrogen, we presumed that the edges of graphene or graphene oxide platelets contained a significant amount of activated C—H bonds. We chose to sulfonate the two samples that had been de-oxygenated for 10 minutes and 45 minutes, respectively, at 1,200° C. The sample with a 10-min de-oxygenation treatment (Sample 4-a-10) was highly soluble in water, but that with a 45-minute treatment (Sample 4-a-45) has poor or limited solubility in water. Sulfonation was conducted by subjecting the two samples to the vapor phase of a fuming sulfuric acid (oleum) containing 20% $SO_3$ for one hour. The results were very surprising. After the sulfonation treatment, Sample 4-a-10 remained highly soluble in water and Sample 4-a-45, originally having limited solubility, became soluble in water. Most surprisingly, the electrical conductivity of their respective films remained essentially un-changed, 12 S/cm and 695 S/cm, respectively. This important observation suggests that further functionalization of de-oxygenated graphene platelets provides another tool of varying solubility of the graphene platelets, as prepared by the presently invented de-oxygenation process, without adversely affecting their conductivity.

Sulfonation is but one of many approaches to the functionalization of de-oxygenated GO platelets. Presumably, both the functional groups attached to basal plane atoms and those at the edges of basal planes (or graphene planes) tend to decrease the electrical conductivity of a graphene or graphene oxide platelet. The surface functional groups are in the way of electron conduction paths and, hence, are much more influential on the electron transport. These groups represent defects that could significantly reduce the mean free path of electrons moving on a basal plane. The functional groups at the graphene edge, although altering the quantum wave functions of electrons at the edge, would have less significant effect on the overall conductivity. However, the presence of different functional groups could have significantly different effects on solubility or dispersibility of a graphene or graphene oxide platelet in a solvent and the interfacial bonding between a platelet and a matrix material in a nanocomposite. This implies that we now have a tool of adjusting the solubility or dispersibility of NGPs in a solvent without significantly varying the electrical conductivity.

Example 5

Preparation of Pristine Graphene from Natural Flake Graphite and Graphite Fibers Using Direct Ultrasonication Five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 75 W (Branson S450 Ultrasonicator) was used for exfoliation, separation, and size reduction for a period of 1 hour. This procedure was repeated several times, each time with five grams of starting graphite powder, to produce a sufficient quantity of pristine NGPs (mostly single-layer or few layers), which are hereinafter referred to as Sample 5-p-U (p stands for pristine and U stands for ultrasonic). In this example, the pristine graphene is well dispersed in water. Formic acid was added to the water solution to obtain a graphene polymer solution after 24 hours.

The same procedure was repeated for graphite fibers to obtain Sample 5 Gf-p-U. The graphite fibers used were the same as those in Example 1.

Example 6

Preparation of Pristine Graphene from Natural Graphite Flakes and MCMBs Using Potassium Intercalation Natural graphite was obtained from Huadong Graphite Co., Qingdao, China. The first stage intercalation compound, $KC_8$, was synthesized by adding a stoichiometric amount of potassium, 81.4 mg (0.0021 moles) to 200 mg (0.0167 moles) of graphite particles in a Pyrex tube capped with a stopcock. All transfers were carried out in a helium filled dry box. The reactant filled tube was evacuated, sealed and heated for 16 hours at 200° C. The compound formed was bright gold in color. The obtained GIC was poured into a mixture of ethanol and distilled water (50:50 by volume). The material turns from gold to black as the graphite got exfoliated and bubbling was observed, suggesting that hydrogen was produced. The resulting solution was basic due to the formation of potassium ethoxide. The dispersion of nano graphene sheets in aqueous ethanol solution was then allowed to settle. The solvent was decanted and the product washed several times with ethanol until a neutral pH was obtained. This pristine NGP material is referred to as Sample 6-p-K (K stands for potassium intercalation).

Another batch of samples was prepared from MCMBs following the same procedures. This pristine NGP material is referred to as Sample 6MC-p-K.

Example 7

Preparation of Pristine NGPs Using Supercritical Fluids

A natural graphite sample (approximately 5 grams) was placed in a 100 milliliter high-pressure vessel. The vessel was equipped with security clamps and rings that enable isolation of the vessel interior from the atmosphere. The vessel was in fluid communication with high-pressure carbon dioxide by way of piping means and limited by valves. A heating jacket was disposed around the vessel to achieve and maintain the critical temperature of carbon dioxide.

High-pressure carbon dioxide was introduced into the vessel and maintained at approximately 1,100 psig (7.58 MPa). Subsequently, the vessel was heated to about 70° C. at which the supercritical conditions of carbon dioxide were achieved and maintained for about 3 hours, allowing carbon dioxide to diffuse into inter-graphene spaces. Then, the vessel was immediately depressurized "catastrophically' at a rate of about 3 milliliters per second. This was accomplished by opening a connected blow-off valve of the vessel. As a result, delaminated or exfoliated graphene layers were formed, which were identified as Sample 7-p-SC-A. This sample was found to contain pristine NGPs with an average thickness just under 10 nm. Approximately two-thirds of Sample 7-p-SC-A was removed from the pressure vessel.

The remaining NGPs were subjected to another cycle of supercritical $CO_2$ intercalation and de-pressurization treatments (i.e., the above procedures were repeated), yielding much thinner NGPs with an average thickness of 2.1 nm (identified as Sample 7-p-SC-B). The specific surface area, as measured by the BET method, was approximately 430 $m^2/g$. TEM and AFM examinations indicated that there were many single-layer graphene sheets in this sample.

Sample 7-p-SC-C was prepared under essentially identical supercritical $CO_2$ conditions, with the exception that a small amount of surfactant (approximately 0.05 grams of Zonyl® FSO) was mixed with 5 grams of natural graphite before the mixture was sealed in the pressure vessel. The resulting NGPs have a surprisingly low average thickness, 3.1 nm. After the pressurization and de-pressurization procedures were repeated for one cycle, the resulting NGPs have an average thickness less than 1 nm, indicating that a majority of the NGPs are single-layer or double-layer sheets. The specific surface area of this sample after a repeated cycle was approximately 900 $m^2/g$. It may be noted that a sample of single-layer graphene sheets should exhibit a specific surface area of >2,670 $m^2/g$. It is clear that the presence of a surfactant or dispersing agent promotes separation of graphene layers, perhaps by preventing the reformation of van der Waals forces between graphene sheets once separated.

Example 8

Controlled Oxidation of Pristine NGPs

The oxidation treatment of the samples prepared in Examples 5-7 was carried out in two different ways: one in a liquid state and the other in a vapor/gas state.

As one example for vapor phase oxidation, $SO_3$ vapor was generated by adding and heating 10 g of fuming sulfuric acid into a reactor The $SO_3$ vapor was passed through a column in which 10 g of pristine NGPs was packed for the oxidation treatment for various durations of time, from 5 minutes to one hour. Upon completion of the oxidation, the column containing oxidized NGPs was slightly heated at about 60° C. for about 15 minutes to remove excessive amount of $SO_3$ condensed on the surface of the NGPs, and the separated $SO_3$ was recovered and absorbed into the sulfuric acid in the reactor. $SO_3$-treated NGPs were washed with water and filtered.

Another example for vapor/gas phase oxidation entails simply exposing NGPs to a heated oxygen or oxygen-containing gas environment (e.g., oxygen gas with a small amount of water, 1% by weight). A suitable temperature range is 250-500° C. for 10 to 120 minutes. It may be noted that graphite oxidation was generally believed to occur only at a temperature higher than 350° C. However, much to our surprise, oxidation of graphene could occur at as low as 200° C. This perhaps is due to the nano-scaled nature of NGPs.

Liquid state oxidation of pristine NGPs can be carried out by simply immersing NGPs in a solution containing an acid and/or oxidizer. More benign acids, such as acetic acid and formic acid, are preferred although it takes a longer period of time to complete an oxidation procedure as compared with sulfuric or nitric acid. More benign oxidizers, such as $H_2O_2$, are preferred over other strong oxidizers, such as potassium permanganate. It was more difficult to wash and remove a salt like potassium permanganate from treated NGPs.

Oxidation conditions of a wide range of pristine NGPs are summarized in Table 1.

TABLE 1

Properties of partially oxidized NGPs.

| Pristine NGP Sample | Oxidation Conditions | Solubility or Dispersibility | Oxygen Contents (wt. %) |
|---|---|---|---|
| 5-p-U | $SO_3$ vapor at 80° C. for 5 to 60 minutes | Soluble in water or alcohol when O content >5% by wt | 3.5-18.5% |
| 5Gf-p-U | $SO_3$ vapor at 80° C. for 5 to 60 minutes | Soluble in water or alcohol when O content >5% by wt | 3.9-21.5% |
| 6-p-K | $O_2$ + 1% water vapor at 350° C. for 10-80 minutes | Soluble in water or alcohol when O content >5% by wt | 4.6-24.5% |
| 6MC-p-K | $O_2$ at 350° C. for 10-80 minutes | Soluble in NMP, toluene, acetone | 2.8-27% |
| 7-p-SC-A | Nitric acid at 45° C. for 5-80 minutes | Soluble in water or alcohol when O content >5% by wt | 5.2-34% |
| 7-p-SC-B | Formic acid at 45° C. for 15-120 minutes | Soluble in water or alcohol when O content >5% by wt | 3.8-28% |
| 7-p-SC-C | Aqueous $H_2O_2$ (30%) solution at 45° C. for 10-120 minutes | Soluble in NMP, toluene, acetone | 5.5-31.3% |

There are two significant observations that can be made from Table 1: (1) Typically, NGPs become soluble in polar solvents, such as water and alcohol, when the oxygen content exceeds 5% by weight; and (2) Some of the NGPs, after partial oxidation, actually become soluble in non-polar solvents, such as NMP and toluene, which is an un-expected result. This is surprising since a higher oxygen content means the presence of more polar groups, such as carboxyl and hydroxyl, that make the NGPs more polar.

Figure 4:
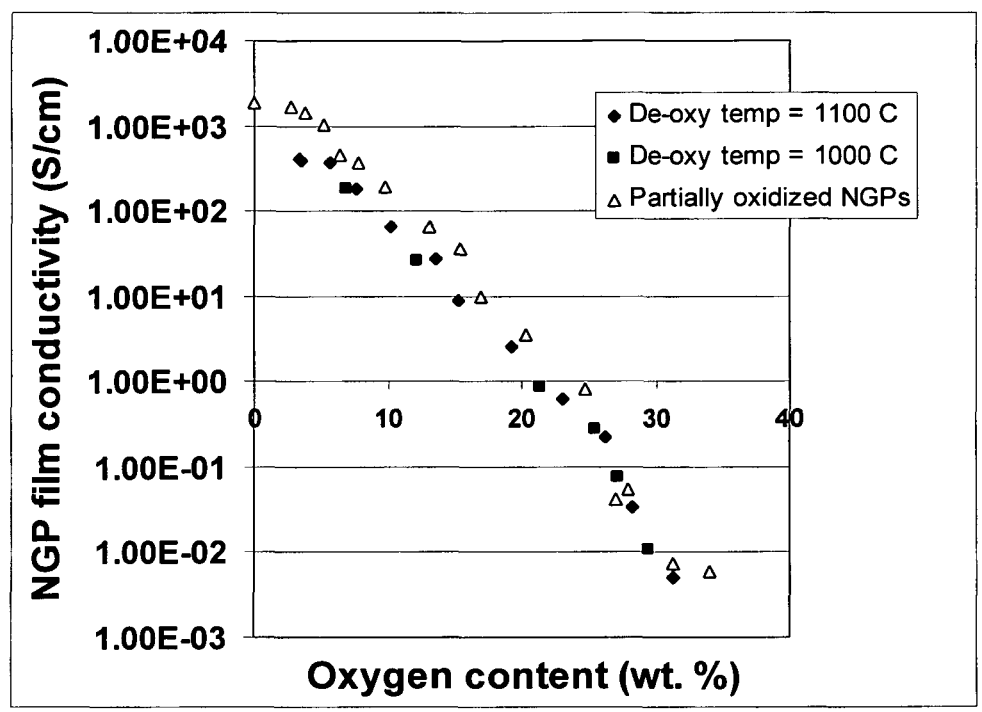
FIG. 4 Electrical conductivity data of pristine NGPs and their partially oxidized versions prepared according to several preferred embodiments of the present invention. The data shown in FIG. 2 were herein repeated for the purpose of comparison.

Pristine and partially oxidized NGPs from selected samples (6MC-p-K, 7-p-SC-A, 7-p-SC-B, and 7-p-SC-C) were made into thin films (approximately 100 nm thick) for electrical conductivity measurements. The results are summarized in FIG. 4, along with the conductivity data of those NGPs or GO prepared from de-oxygenating heavily oxidized GO platelets. It is clear that the electrical conductivity of NGPs or GO nano platelets decreases with increasing oxygen content, regardless of the preparation routes.

For those samples prepared from oxidation of pristine NGPs, the conductivity is normally greater than 1 S/cm if the oxygen content is less than 25% by weight, similar to the case of partially de-oxygenated GN platelets. However, the electrical conductivity of those prepared by partially oxidizing pristine NGPs is almost always greater than that of those prepared by partially de-oxygenating GO nano platelets with a comparable oxygen content. This is another highly surprising result of the present study. We speculated that those heavily oxidized GO platelets were highly defected, likely with their graphene plane populated with oxygen-containing chemical groups. Even after partial de-oxygenation, these original chemical group sites remain as structural defects. By contrast, oxidation of pristine NGPs might begin with the graphene edges and chemical groups began to attach to the graphene surface only after the edges were fully oxidized.

Example 9

Various Surface Functionalization Treatments of Partially Oxidized Graphene

The partially oxidized graphene prepared according to a preferred embodiment of the present invention can be further functionalized by carrying out an additional step of contacting the partially oxidized NGPs with a reactant such that a functional group is added to a surface or edge of the nano graphene platelet. The functional group may be selected from, as examples, alkyl or aryl silane, alkyl or aralkyl group, hydroxyl group, amine group, fluorocarbon, or a combination thereof.

As an example, two separate batches of Sample 6-p-K were subjected to oxidation treatments to obtain Sample 6-p-K-4.6 (oxygen content of 4.6% by weight) and Sample 6-p-K-24.5 (oxygen content of 24.5% by weight). They were then allowed to undergo various functionalization treatments, briefly described as follows:

The NGPs, after a partial oxidation treatment, will have a reactive graphene surface (RGS) or reactive graphene edge (RGE). They were prescribed to undergo the following reactions:

(a) RGS/RGE+$CH_2$=CHCOX (at 1,000° C.)→Graphene-R'COH (where X=—OH, —Cl, —$NH_2$, or —H); e.g., RGS/RGE+$CH_2$=CHCOOH→G-R'CO—OH (where G=graphene);

(b) RGS/RGE+Maleic anhydride→+G-R'$(COOH)_2$;

(c) RGS/RGE+Cyonogen→G-CN;

(d) RGS/RGE+$CH_2$=CH—$CH_2$X→G-R'$CH_2$X (where X=—OH, -halogen, or —$NH_2$);

(e) RGS/RGE+$H_2O$→G=O (Quinoidal);

(f) RGS/RGE+$CH_2$=CHCHO→G-R'CHO (Aldehydic);

(g) RGS/RGE+$CH_2$=CH—CN G→R'CN;

In the above-listed reactions, R' is a hydrocarbon radical (alkyl, cycloalkyl, etc).

The results of electrical conductivity measurements of the NGP films and observations on solubility of NGPs in solvents are summarized in Table 2. These data further confirm that chemical functionalization treatments can be used to vary the solubility or dispersibility of NGPs without significantly compromising electrical conductivity.

TABLE 2

Conductivity and solubility of functionalized NGPs.

| Sample | Functionalization Treatment | Thin Film Electrical Conductivity (S/cm) | Thin Film Thermal Conductivity (W/m-K) | Solubility in a Solvent |
|---|---|---|---|---|
| 6-p-K-24.5 | None | 0.9 | 160 | Highly soluble in water, acetone, ethanol, etc. |
| 6-p-K-4.6 | None | 1,036 | 1,320 | Limited solubility in water, acetone, ethanol |
| 6-p-K-4.6 | Reaction (a), X = —OH | 988 | 932 | Became soluble in water and ethanol |
| 6-p-K-4.6 | Reaction (b) | 983 | 820 | Became soluble in water and ethanol |
| 6-p-K-24.5 | Reaction (c) | 0.8 | 115 | Highly soluble in water, acetone, ethanol, etc. |
| 6-p-K-4.6 | Reaction (d), X = —NH$_2$ | 985 | 910 | Became soluble in acetone |
| 6-p-K-24.5 | Reaction (e) | 1.1 | 202 | Highly soluble in water, acetone, ethanol, etc. |
| 6-p-K-24.5 | Reaction (e) | 1.0 | | Highly soluble in water, acetone, ethanol, etc. |
| 6-p-K-24.5 | Reaction (f) | 0.9 | 76 | Highly soluble in water, acetone, ethanol, etc. |

Example 10

Functionalization or Derivatization of Partially Oxidized Graphene

Partial oxidation of pristine NGPs can lead to the attachment of some functional groups on a surface or at an edge of a graphene plane, including carboxylic acid and hydroxyl groups. A large number of derivatives can be prepared from carboxylic acid alone. For instance, alcohols or amines can be easily linked to acid to provide stable esters or amides. If the alcohol or amine is part of a di- or poly-functional molecule, then linkage through the O— or NH— leaves the other functional group(s) as pendant group(s). For instance, we can have R—OH or R—NH$_2$, where R=alkyl, aralkyl, aryl, fluoroethanol, polymer, and SiR'$_3$. Examples include Cl—SiR'$_3$, HO—R—OH (R=alkyl, aralkyl, or CH$_2$O—), H$_2$N—R—N$_2$H(R=alkyl, aralkyl), X—R—Y (R=alkyl, etc.; X=OH or NH$_2$; Y=SH, CN, C=O, CHO, alkene, alkyne, aromatic, or heterocycles).

As an example, Sample 6-p-K-24.5 was treated to undergo the following reactions: R—COOH+Im-CO-Im→R—CO-Im+Him+CO$_2$ (Im=imidazolide) and Him=imidazole), which was followed by R—CO-Im+R'OH (in NaOEt)→R—CO—OR'+HIm, and, separately for another specimen, by R—CO-Im+R'NH$_2$→R—CO—NHR'+Him.

Example 11

Supercapacitor Electrode Using Graphene Polymer as a Binder

The graphene polymer solution prepared in Example 5 was used to make supercapacitor electrodes. In a typical procedure, a desired amount of activated carbon (AC) particles (e.g., CECA 4S+ with a specific surface area of 1,700 m$^2$/g) was added into a graphene solution with the total solid content preferably lower than 70%, more preferably lower than 50% by weight. The graphene polymer-to-AC ratio was varied between 5/95 and 95/5, but preferably between 5/95 and 30/70 that provided the best supercapacitance performance with a specific capacitance of 47-65 F/g. As a point of reference, the specific capacitance of a corresponding supercapacitor based on activated carbon alone was 39 F/g.

Example 12

Anode of a Lithium Ion Battery

Figure 5:
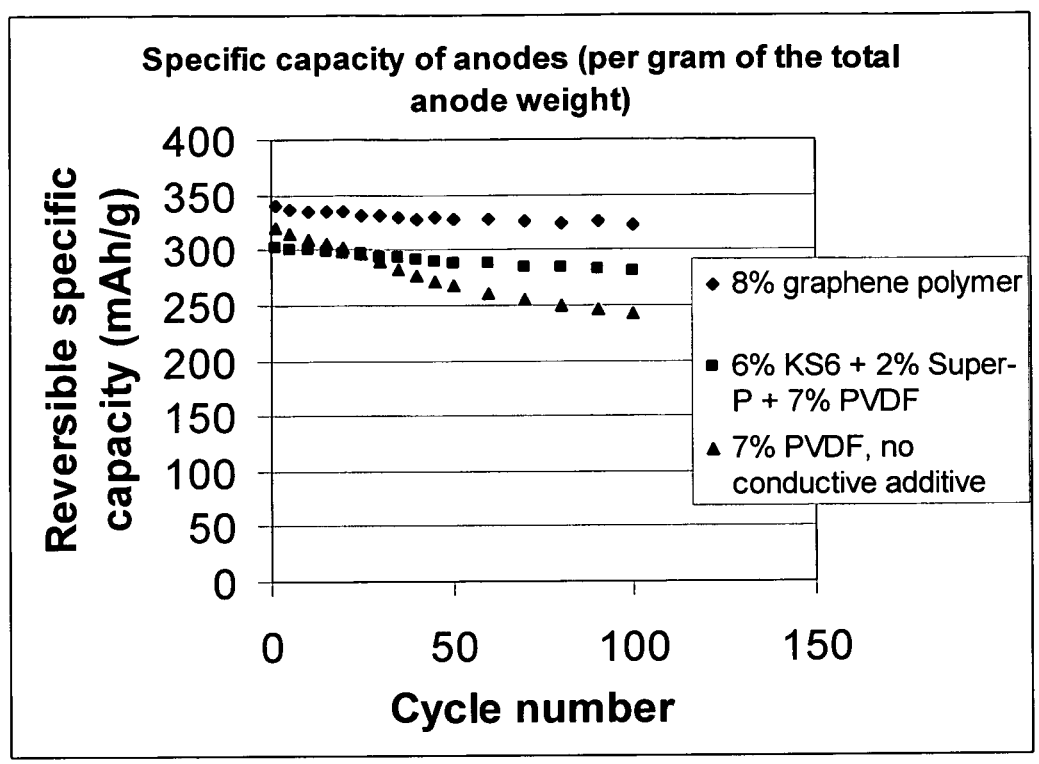
FIG. 5 Charge/discharge cycling behavior of lithium ion batteries containing anodes with different binder-additive combinations.

Three electrodes for use in a lithium ion battery were prepared from modified graphite particles (SG-10 from Huadong Graphite Co., QingDao, China) coated with a thin carbon layer as an anode active material. Three samples were prepared by mixing these graphite particles with (a) a graphene polymer, (b) a 7% PVDF binder+6% KS6 graphite+Super-P CB additives (from Timcal), and (c) 7% PVDF binder (no conductive additive). The graphene polymer solution obtained in Example 3 was mixed with SG-10 graphite particles to form a paste, which was coated to a sheet of copper foil. A button cell was made by sandwiching this electrode, a separator film, and a lithium foil, soaked in a liquid electrolyte (1 M LiPF$_6$ in EC:DMC=1:1). Other two cells with a different binder or additive were made in a similar manner. The three cells were subjected to charge-discharge cycling tests. FIG. 5 shows the results of the cycling tests for these three cells. These data clearly demonstrate the superiority of using a graphene polymer as a binder, which is itself an effective conductive additive. Without having to use an additional resin binder, such as PVDF, the proportion of the electro-active material (surface-modified graphite particles) in the electrode was higher, resulting in a higher specific capacity based on per unit of the total electrode weight. The cell with PVDF as an electrode binder and without a conductive additive exhibits a high decay rate in reversible specific capacity.

Example 13

Cathode of a Lithium Ion or Lithium Metal Battery

Several dry electrodes containing lithium cobalt oxide as an electroactive material were prepared by mixing fine particles of lithium cobalt oxide in the graphene suspension prepared in Example 5 to form a paste. The paste was cast onto a surface of a piece of glass, with the liquid medium removed to obtain a dry electrode.

For comparison purposes, corresponding dry electrodes were prepared for three samples: graphene polymer+carbon black (CB); expanded graphite particles+CB; and CB particles only. The sample containing graphene polymer and CB was prepared by mixing CB and lithium cobalt oxide particles in the graphene suspension with an one-to-one graphene-to-CB ratio. Expanded graphite particles were prepared by chemical intercalation (sulfuric acid+nitric acid at a 3-to-1 ratio at room temperature for two hours) and thermal exfoliation (at 650° C. for 45 seconds) to obtain graphite worms, which were broken up in a household blender to obtain graphite flakes with an average thickness of >200 nm. These expanded graphite particles were not re-dispersed in an acid medium to produce graphene polymer solution. Instead, the expanded graphite particles and CB particles, at an one-to-one ratio, were added to a PVDF-NMP solution to form a paste. NMP was rapidly removed to obtain a dry electrode.

Figure 6A:
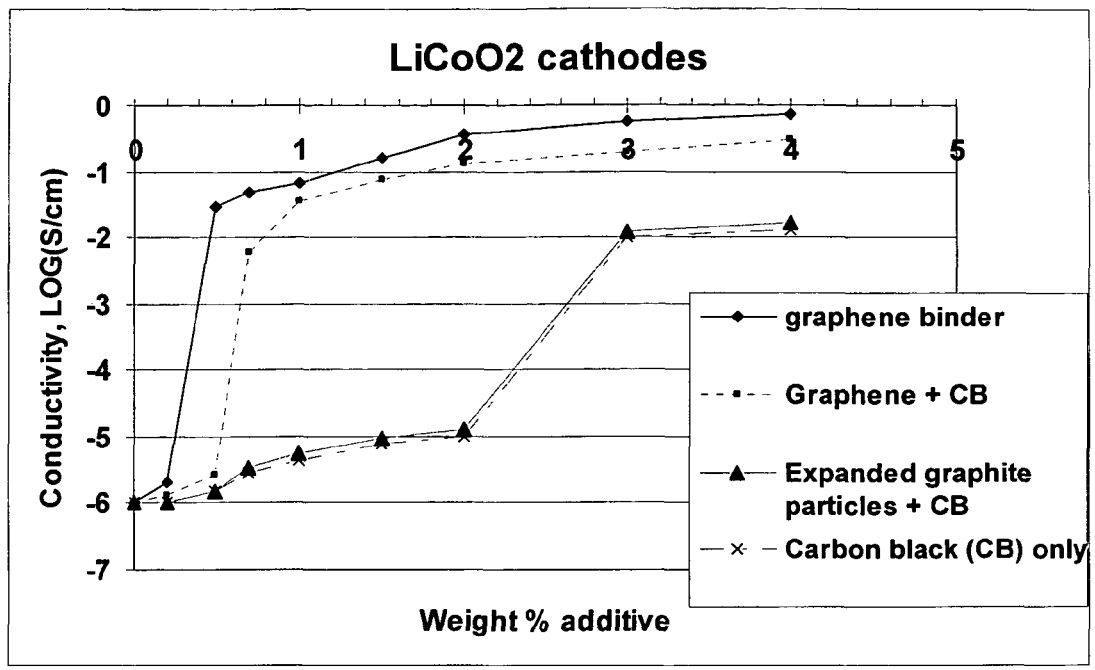
FIG. 6 Electrical conductivity of various dry electrodes (cathodes) each plotted as a function of the weight % of a binder-additive: (A) conductivity expressed in a 10-based logarithm scale and (B) in a linear scale. Note that the electrodes containing no graphene polymer binder would need an additional amount of binder (typically 5-10% by weight), which is usually a non-conductive and non-electroactive. The PVDF binder weight was not included in the calculation.
Figure 6B:
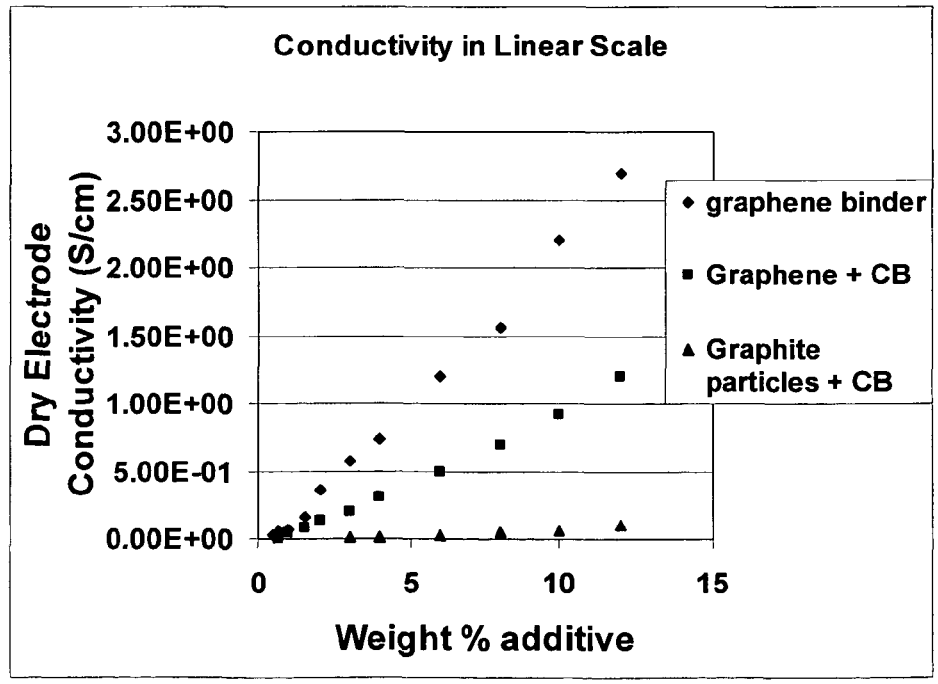

The electrical conductivity of various dry electrodes (cathodes) was measured and plotted as a function of the weight % of the binder or additive in FIGS. 6(A) and 6(B). In the electrodes containing graphene polymer, the graphene polymer serves as a binder as well as a conductive additive (no PVDF or SBR was added as a binder). It is clear that graphene polymers help the electrode achieve a state of percolation (characterized by the formation of a 3-D network of electron-conducting paths) at a weight % as low as 0.5%. The CB and expanded graphite particles did not reach the point of percolation until about 3% by weight. Even at the same weight %, the graphene polymer appears to impart higher conductivity to the electrode. These conductivity data clearly demonstrate that graphene polymer is a superior binder for an electrochemical cell, such as a lithium battery.

It may be noted that the electrodes containing no graphene polymer binder needed an additional amount of a resin binder (typically 5-10% by weight), which is usually a non-conductive and non-electroactive. This non-electroactive binder further reduces the proportion of an electroactive material (i.e. lithium cobalt oxide in the present example). In the present cases, the 7% PVDF used in the "CB only" and "expanded graphite+CB" samples was not included in the calculation of the additive weight %. If this 7% had been added, the two lower curves in FIG. 6(A) would have been shifted to the far right by 7%.

It may be further noted that the cathode active material that can be used in the presently invented electrode is not limited to lithium cobalt oxide. There is no particular limitation on the type of electroactive material that can be used.

The invention claimed is:

1. An electrically conductive electrode for an electrochemical cell, said electrode comprising particles of an electroactive material and a conductive graphene polymer binder that bonds multiple particles of the electro-active material together to form said electrode, wherein said binder is obtained by mixing graphene sheets in a selected liquid medium at a temperature for a desired period of time to become a graphene polymer solution or suspension, mixing the electro-active material with the solution or suspension, and removing the liquid medium such that the graphene polymer bonds the particles of electro-active material, said binder is present in an amount of from 0.01% to 90% by weight based on the total electrode weight and wherein said electrode is an electrode of a metal-air battery, lithium metal battery, lithium-air battery, non-lithium alkali battery, alkaline battery supercapacitor, or a cathode of a lithium-ion battery.

2. The electrode of claim 1 wherein the binder amount is from 0.5% to 50% by weight of the total electrode weight.

3. The electrode of claim 1 wherein the binder amount is from 1% to 15% by weight of the total electrode weight.

4. The electrode of claim 1, further comprising a conductive filler in the amount of from 1% to 15% by weight of the total electrode weight.

5. The electrode of claim 1 wherein said graphene polymer has a length or width in the range of 10 nm to 10 µm.

6. The electrode of claim 1 wherein said graphene polymer has a length or width in the range of 100 nm to 1 µm.

7. The electrode of claim 1 wherein said graphene polymer has an electrical conductivity greater than $10^{-5}$ S/cm when measured in a thin film form with a thickness less than 1 µm.

8. The electrode of claim 1 wherein said graphene polymer has an electrical conductivity greater than 1 S/cm when measured in a thin film form with a thickness less than 1 µm.

9. The electrode of claim 1 wherein said graphene polymer has an electrical conductivity greater than 10 S/cm and/or thermal conductivity greater than 10 W/mK when measured in a thin film form with a thickness less than 1 µm.

10. The electrode of claim 1 wherein said graphene polymer has an electrical conductivity greater than 100 S/cm and/or thermal conductivity greater than 100 W/mK when measured in a thin film form with a thickness less than 1 µm.

11. The electrode of claim 1 wherein said graphene polymer has an electrical conductivity greater than 500 S/cm and/or thermal conductivity greater than 200 W/mK when measured in a thin film form with a thickness less than 1 µm.

12. The electrode of claim 1 wherein said graphene polymer has a thermal conductivity greater than 300 W/mK when measured in a thin film form with a thickness less than 1 µm.

13. The electrode of claim 1 wherein said electrode is a lithium-ion or lithium metal battery cathode having an electrical conductivity greater than $10^{-6}$ S/cm when measured in a dry electrode state without electrolyte.

14. The electrode of claim 1 wherein said electrode is a cathode of a lithium-ion or lithium metal cell, said cathode having an electrical conductivity greater than $10^{-3}$ S/cm when measured in a dry electrode state without electrolyte.

15. The electrode of claim 1 wherein said electrode is a cathode of a lithium-ion or lithium metal cell having an electrical conductivity greater than 1 S/cm when measured in a dry electrode state without electrolyte.

16. The electrode of claim 1 wherein said graphene polymer has an oxygen content less than 25% by weight.

17. The electrode of claim 1 wherein said graphene polymer has an oxygen content less than 5% by weight.

18. The electrode of claim 1 wherein said graphene polymer has a chemical functional group attached to an edge or surface of the graphene polymer.

19. The electrode of claim 1 which electrode is produced by (a) preparing a precursor solution or suspension wherein said graphene polymer is dissolved or dispersed in a liquid medium; (b) mixing multiple particles of the electro-active material in said precursor solution or suspension to form a slurry or paste; (c) applying a coating of said slurry or paste onto a current collector; and (d) removing said liquid medium from said coating to form said electrode.

20. A lithium metal battery, lithium-ion battery, or lithium-air battery containing the electrode of claim 1.

21. A supercapacitor containing the electrode of claim 1.

22. An electrically conductive electrode for an electrochemical cell, said electrode comprising particles of an electroactive material and a conductive graphene polymer binder that bonds multiple particles of the electro-active material together to form said electrode, wherein said binder is obtained by mixing graphene sheets, in a selected liquid medium at a temperature for a desired period of time to become a graphene polymer solution or suspension, mixing the electro-active material with the solution or suspension, and removing the liquid medium such that the graphene polymer bonds the particles of electro-active material, and said binder is present in an amount of from 0.01% to 90% by weight based on the total electrode weight, wherein said graphene polymer has an oxygen content in the range of 2.8% to 34% by weight.

23. An electrically conductive electrode for an electrochemical cell, said electrode comprising particles of an electroactive material and a conductive graphene polymer binder that bonds multiple particles of the electro-active material together to form said electrode, wherein said binder is obtained by mixing graphene sheets, in a selected liquid medium at a temperature for a desired period of time to become a graphene polymer solution or suspension, mixing the electro-active material with the solution or suspension, and removing the liquid medium such that the graphene polymer bonds the particles of electro-active material, said binder is present in an amount of from 0.01% to 90% by weight based on the total electrode weight, wherein said graphene polymer has a chemical functional group attached to an edge or surface of the graphene polymer and wherein said chemical functional group is selected from the group consisting of alkyl or aryl silane, alkyl or aralkyl group, carboxyl group, amine group, sulfonate group ($-SO_3H$), aldehydic group, quinoidal, fluorocarbon, and combinations thereof.

* * * * *